(12) United States Patent
Cigler et al.

(10) Patent No.: US 12,005,416 B2
(45) Date of Patent: Jun. 11, 2024

(54) METHOD OF PRODUCTION OF IRRADIATED PARTICLES

(71) Applicants: USTAV ORGANICKE CHEMIE A BIOCHEMIE AV CR, V. V. I., Prague (CZ); USTAV MAKROMOLEKULARNI CHEMIE AV CR, V. V. I., Prague (CZ)

(72) Inventors: Petr Cigler, Prague (CZ); Jan Havlik, Znojmo (CZ); Martin Hruby, Prague (CZ); Jan Kucka, Kozinec (CZ)

(73) Assignees: USTAV ORGANICKE CHEMIE A BIOCHEMIE AV CR, V. V. I., Prague (CZ); USTAV MAKROMOLEKULARNI CHEMIE AV CR, V. V. I., Prague (CZ)

( * ) Notice: Subject to any disclaimer, the term of this patent is extended or adjusted under 35 U.S.C. 154(b) by 761 days.

(21) Appl. No.: 17/260,132

(22) PCT Filed: Jul. 8, 2019

(86) PCT No.: PCT/CZ2019/050031
§ 371 (c)(1),
(2) Date: Jan. 13, 2021

(87) PCT Pub. No.: WO2020/015769
PCT Pub. Date: Jan. 23, 2020

(65) Prior Publication Data
US 2021/0283568 A1    Sep. 16, 2021

(30) Foreign Application Priority Data

Jul. 17, 2018 (GB) .................... 1811669

(51) Int. Cl.
*B01J 19/08* (2006.01)
*C01B 32/28* (2017.01)
*C01B 32/956* (2017.01)

(52) U.S. Cl.
CPC ............. *B01J 19/084* (2013.01); *C01B 32/28* (2017.08); *C01B 32/956* (2017.08);
(Continued)

(58) Field of Classification Search
CPC ............. B01J 19/084; B01J 2219/0879; B01J 2219/12; C01B 32/28; C01B 32/956; C01P 2002/76; C01P 2004/61; C01P 2004/62

See application file for complete search history.

(56) References Cited

U.S. PATENT DOCUMENTS

2009/0302226 A1    12/2009 Schieber et al.

OTHER PUBLICATIONS

Mita, Yoshimi. "Change of absorption spectra in type-Ib diamond with heavy neutron irradiation." Physical Review B 53.17 (1996): 11360.*
Khasawinah, S. A., et al. "Neutron irradiation and annealing of 10B doped chemical vapor deposited diamond films." Journal of materials research 10.10 (1995): 2523-2530.*
(Continued)

*Primary Examiner* — Richard M Rump
(74) *Attorney, Agent, or Firm* — Notaro, Michalos & Zaccaria P.C.

(57) ABSTRACT

The present invention relates to a process for ion irradiation of a particulate substrate containing the steps of embedding particulate substrate in a solid matrix having 10B atoms, and exposing the matrix obtained in the previous step to a neutron flux to give irradiated particulate substrate. The process is extremely effective and amenable to large scale and is particularly suitable for producing irradiated nanodiamonds and irradiated SiC particles.

17 Claims, 4 Drawing Sheets

(52) U.S. Cl.
CPC .... *B01J 2219/0879* (2013.01); *B01J 2219/12* (2013.01); *C01P 2002/76* (2013.01); *C01P 2004/61* (2013.01); *C01P 2004/62* (2013.01)

(56) References Cited

OTHER PUBLICATIONS

Steeds, John W., N. Peng, and W. Sullivan. "Anti-site Defects are Found at Large Distances from Localised H and He Ion Implantations." Materials Science Forum. vol. 615. Trans Tech Publications Ltd, 2009.*
McCloskey, D., et al. "Helium ion microscope generated nitrogen-vacancy centres in type Ib diamond." Applied Physics Letters 104.3 (2014).*
Gosset et al: Boron carbide as a potential inert matrix: an evaluation, Progress in Nuclear Energy, vol. 38, No. 3-4, Jan. 1, 2001 (2001), pp. 263-266, http://dx.doi.org/10.1016/S0149-1970(00)00113-X, downloaded Jan. 13, 2021.
E. Burzo et al: "Magnetic properties of nonirradiated and neutron irradiated iron-lead-borate glasses", Journal of Applied Physics, vol. 58, No. 9,Nov. 1, 1985 (Nov. 1, 1985), pp. 3628-3629, XP055618869, http://dx.doi.org/10.1063/1.335740 , downloaded Jan. 13, 2021.
Jan Havlik et al: "Boosting nanodiamond fluorescence: towards development of brighter probes", NANOSCALE, vol. 5, No. 8, Jan. 1, 2013, p. 3208, http://dx.doi.org/10.1039/c2nr32778c , downloaded Jan. 13, 2021.
International Search Report and Written Opinion for corresponding PCT application No. PCT/CZ2019/050031, mailed Nov. 7, 2019.

\* cited by examiner

METHOD OF PRODUCTION OF IRRADIATED PARTICLES

FIELD OF ART

The invention relates to a process for the treatment of a particulate substrate to alter its properties, and to particulate compositions obtained thereby.

BACKGROUND OF THE INVENTION

Over the past two decades, nanomaterials research has generated a wealth of experimental and theoretical data showing that the atomic structure and morphology of nanomaterials can be changed in a controllable manner. While a chemical approach enables a plethora of synthetic modifications to the nanomaterial surface, currently available tools for post-preparative tailoring of the inner atomic structure of nanoparticles, and more generally, particles, are based mostly on use of ionizing radiation.

Among ionizing particles, energetic ions are attractive for materials science because they are very efficient in causing controlled structural defects in solid materials. Modification with energetic ions thus represents a key approach to the creation of a variety of functional nanostructured materials, which has enabled advances in numerous research fields. In optics, this approach is used to create lattice point defects, including vacancies, color centers, and single-photon emitters. In nanoscience, researchers have used modification with energetic ions to fabricate and tailor new types of materials, including magnetic, semiconductor, and carbon nanomaterials. Irradiation with energetic ions also provides a means to radiolabel nanoparticles for biological tracing.

Most (nano)particles can be engineered using so-called light ions [$^1H^+$, $^2H^+$, $^3He^+$, $^4He^+$, a particles ($^4He^{2+}$), and $^7Li^+$]. Compared to heavier ions, their range in materials is much higher and they cause less damage. For example, irradiation with a particles or $He^+$ ions can be used for tuning of the optical, electric, and magnetic properties of various nanomaterials based on carbon, boron nitride nanotubes, semiconductors, magnetic nanoparticles, silica, metallic clusters, and polymers.

Although there is an impressive range of suggested applications for ion-irradiated (nano)particles, a major challenge remains in well-controlled mass preparation of these particles. To achieve uniform irradiation of a sufficient amount of material in accelerator sources, the ion beam is defocused and collimated just before entry to the target. However, the ion density may vary up to 20% due to distribution of ion density in the beam cross section. Due to energetic inhomogeneity, the ion ranges in the target also may differ significantly. For energetic ions, penetration depth is typically millimeters to centimeters in the case of $p^+$, but only micrometers to hundreds of micrometers for heavier ions, depending on ion energy and target density. The energetic ions lose energy along their path and end their way with the Bragg peak, beyond which there is negligible influence on the matter. Moreover, nanoparticle powders exhibit poor thermal conductivity and may overheat under irradiation, necessitating the use of thin nanoparticle layers in the target to prevent thermally induced alterations of the nanoparticles. These reasons make scale-up of production extremely challenging, because only very thin layers of nanoparticles can be efficiently and homogeneously irradiated.

An important representant of particles requiring ion-irradiation during its preparation is fluorescent nanodiamond (FND) containing nitrogen-vacancy (NV) centers. NV centers in FNDs can be used for ultrasensitive sensing of magnetic and electric field sensors, hyperpolarisation of $^{13}C$ nuclear spin in a diamond, and construction of chemical probes. They can be also used as single photon emitters, and qubits. The fluorescence of NV centers is spin-dependent, which enables coherent manipulation of single NVs and measurement of optically detected magnetic resonance of single spins in ambient conditions. FNDs show low toxicity, and their use as bright near-infrared fluorescent probes in high-resolution biomedical imaging and nanomedicine has recently been demonstrated. Despite recent advances in preparation procedures, wider use of FNDs remains limited by the need for time-consuming and expensive irradiation with energetic ions or electrons, which allows production of only a small amount of material (up to hundreds of milligrams) at once. Current irradiation approaches are summarized in Nagl, A., Hemelaar, S. R. & Schirhagl, R. Improving surface and defect center chemistry of fluorescent nanodiamonds for imaging purposes—a review. *Anal. Bioanal. Chem.* 407, 7521-7536 (2015); and Hsiao, W. W.-W., Hui, Y. Y., Tsai, P.-C. & Chang, H.-C. Fluorescent Nanodiamond: A Versatile Tool for Long-Term Cell Tracking, Super-Resolution Imaging, and Nanoscale Temperature Sensing. *Acc. Chem. Res.* 49, 400-407 (2016).

The formation of NV centers in nanodiamonds is technically a two-step process and typically involves i) generation of vacancies in the diamond lattice using irradiation with energetic particles, followed by ii) recombination of vacancies with atomic nitrogen impurities upon high temperature annealing.

Another important nanomaterial requiring ion-irradiation during its preparation are silicon carbide nanoparticles (SiC), one of key materials used in development of next-generation photonic and electronic devices. SiC forms various polytypes harboring a range of different lattice defects, which can be created upon irradiation with energetic particles. Some exhibit single-photon emission and can be employed as room-temperature solid-state qubits. For example, the cubic 3C-SiC polytype enables creation of a single-photon emitter—the carbon antisite-vacancy pair. The formation of this pair requires a two-step process and typically involves generation of vacancies in the SiC lattice using irradiation with energetic particles followed by formation of the pairs upon high temperature annealing. In addition, 3C—SiC nanoparticles are biocompatible and can be used as photostable fluorescent labels in cell imaging. As with FNDs, wider use of photoluminescent SiC is limited because the current irradiation approaches allow production of only a small amount of material.

Although the potential applications of ion-irradiated (nano)particulate materials span an impressive range from electronics to biomedicine, mass preparation remains a major challenge, largely due to the physical and technical limitations of irradiation techniques.

SUMMARY OF THE INVENTION

According to a first aspect, the invention provides a process for ion irradiation of a particulate substrate, comprising the steps of:
   a. embedding particulate substrate in a solid matrix comprising $^{10}B$ atoms;
   b. exposing the matrix obtained in step a) to a neutron flux;
   to give irradiated particulate substrate.

According to a second aspect, the invention provides an irradiated particulate substrate obtainable according to the process of the invention.

According to a third aspect, the invention relates to a process for creating nitrogen-vacancy centers in diamond particles, comprising the steps of
a. embedding diamond particles in a solid matrix comprising $^{10}$B atoms; and
b. exposing the matrix obtained in step a) to a neutron flux.

According to a fourth aspect, the invention relates to a process of creating the carbon antisite-vacancy pairs in silicon carbide particles, comprising the steps of
a. embedding silicon carbide particles in a solid matrix comprising $^{10}$B atoms; and
b. exposing the matrix obtained in step a) to a neutron flux.

DETAILED DESCRIPTION OF THE INVENTION

Figure 1:
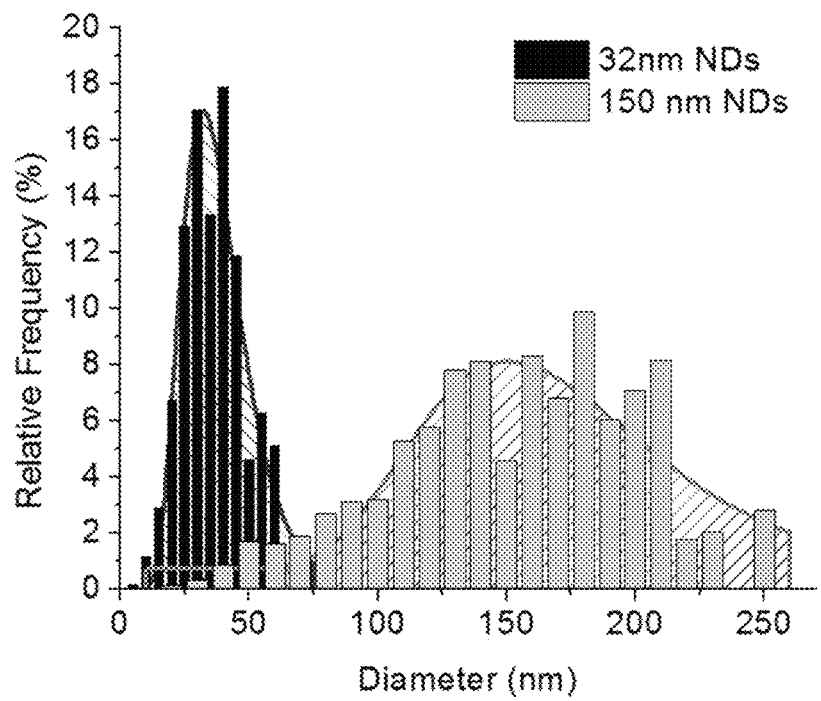
FIG. 1 is a histogram showing size distributions based on analysis of approximately 1000 particles obtained from TEM micrographs.

The invention relates to a new scalable method for rapid isotropic irradiation of materials (particulate substrates) by light ions formed homogeneously in situ by a nuclear reaction. Neutrons captured by $^{10}$B generate an isotropic flux of energetic α particles and $^{7}$Li$^+$ that uniformly irradiates the surrounding particles. These light energetic ions are formed from $^{10}$B contained in the solid matrix upon irradiation of the matrix by neutrons, by two nuclear reaction channels, described by equations (1) and (2), and occurring with different probabilities (P)

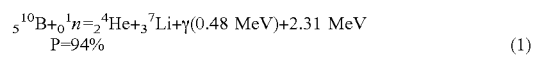

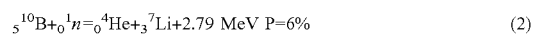

with a total absorption cross section of approximately 3,800 barns for thermal neutrons. These nuclear reactions are utilized in the methods described herein for isotropic irradiation of a bulk sample containing homogeneously distributed nanoparticles, instead of the prior art techniques of exposing a thin layer of nanoparticles to an energetic ion beam, the range of which is low and results in a characteristic non-homogeneous distribution of defects in material (Bragg peak). Energetic ions are generated homogeneously in the entire sample volume by reaction of $^{10}$B with thermal neutrons, and form the desired structural defects in particles such as lattice vacancies. The vacancies can optionally be further transformed to other defects upon thermal annealing of the irradiated particulate material.

In the method of the present invention, the generated isotropic flux of energetic α particles and $^{7}$Li$^+$ thus uniformly irradiates the surrounding nanoparticles. The particulate substrate is exposed to the energetic ions produced in the solid matrix surrounding the particulate substrate from all sides, the energetic ions thus coming from all directions.

The present invention provides a process for (energetic light) ion irradiation of a particulate substrate, comprising the steps of:
a. embedding particulate substrate in a solid matrix comprising $^{10}$B atoms;
b. exposing the matrix obtained in step a) to a neutron flux;
to give irradiated particulate substrate.

The solid matrix comprises $^{10}$B atoms. These may be provided from any suitable $^{10}$B—containing material, including elemental boron, oxides of boron, boronic acids, borates, borides, borate esters, borosilicates and mixtures thereof. Preferably, the $^{10}$B-containing material is selected from borates and boron oxides. Most preferably, the $^{10}$B-containing material is boron oxide, more specifically $^{10}$B$_2$O$_3$ (diboron-10 trioxide).

The solid matrix may also be referred to as the boron-containing matrix.

In some preferred embodiments, the $^{10}$B-containing material is boron oxide (B$_2$O$_3$) which contains $^{10}$B atoms in naturally occurring ratio, or is enriched in $^{10}$B atoms.

In other embodiments, the $^{10}$B-containing material in the starting solid matrix is boronic acid (H$_3$BO$_3$) which contains $^{10}$B atoms in naturally occurring ratio, or is enriched in $^{10}$B atoms. Boronic acid may be subjected to dehydration after the step of embedding particulate substrate in the solid matrix, yielding boron oxide. Boronic acid may in such embodiments be considered to be a precursor of boron oxide which is then present in the matrix after dehydration.

In some embodiments, the matrix comprises a boron-containing material that has a mixture of boron isotopes. The solid matrix typically comprises both $^{10}$B and $^{11}$B atoms. In some embodiments, the solid matrix comprises $^{10}$B and $^{11}$B atoms in the natural (naturally occurring) isotopic ratio. In other embodiments, the solid matrix comprises boron that is enriched in $^{10}$B compared to the natural isotopic ratio of $^{10}$B to $^{11}$B, i.e., the boron-containing material comprises boron that is enriched in $^{10}$B.

In a preferred embodiment, the boron-containing material contains boron having the naturally-occurring mixture of boron isotopes. The use of B$_2$O$_3$ having the naturally-occurring mixture of boron isotopes is preferred for some embodiments. In alternative embodiments, the boron-containing material comprises boron that is enriched in $^{10}$B.

The solid matrix may optionally contain further components, in addition to the boron-containing material. These further components may include substances affecting or improving the physical properties of the matrix, such as inert fillers, lubricants, disintegrants, etc. In some embodiments, the matrix consists predominantly (such as more than 50%, more that 75%, or more than 90% by weight), or substantially completely, of the boron-containing material, in particular of $^{10}$B-containing material.

As used herein, the term "particulate substrate" or "substrate" refers to a material that is treated in the process of the invention, i.e. the starting material. The substrate is referred to as "particulate" because it is typically in the form of particles.

Particulate substrates are preferably those falling in the category of nanoparticles. The term "nanoparticle" as used herein refers to a particle having a diameter of between 0.5 nm and 10 μm, preferably between 1 nm and 5 μm, more preferably between 1 nm and 2 μm. Similarly, by the term "nanoparticles" is meant a plurality of particles having an average diameter of between 0.5 nm and 10 μm. The skilled person will appreciate that "diameter" in this context refers to the diameter of a spherical particle, or the equivalent spherical diameter (ESD) of an irregularly shaped object, being the diameter of a sphere of equivalent volume. The particle sizes are typically measured by image analysis of TEM micrographs (method described in: Rehor & Cigler, Diamond & Related Materials 2014, 46, 21-24).

For populations of nanoparticles, preferably at least 50% or at least 70% of the particles fall within a defined size range (the % corresponds to number-weighted distribution). Preferably, at least 50% (D50, number-weighted distribution) or at least 70% (D70, number-weighted distribution) of the particles have a diameter (as hereinbefore defined) of between 1 nm and 2 μm. More preferably, at least 80% of the particles have a diameter (as hereinbefore defined) of between 1 nm and 2 μm. Still more preferably, at least 90% of the particles have a diameter (as hereinbefore defined) of between 1 nm and 2 μm.

In some embodiments, the particulate substrate is or comprises nanodiamonds. By "comprises nanodiamonds", it is meant that at least 30 wt. %, or at least 50 wt. %, or at least 70 wt. %, or at least 90 wt. % of the particulate substrate is formed by nanodiamonds.

In some embodiments, the particulate substrate is or comprises silicon carbide. By "comprises silicon carbide", it is meant that at least 30 wt. %, or at least 50 wt. %, or at least 70 wt. %, or at least 90 wt. % of the particulate substrate is formed by silicon carbide.

The matrix produced in the first step and irradiated in the second step of the method of the invention is a physical mixture of the particulate substrate with the solid matrix.

Any ratio of particulate substrate to solid matrix material may be employed, but it is preferred that the particulate substrate forms from 1 to 50% by weight based on the total weight of the matrix and the particulate substrate. More preferably, the particulate substrate forms from 20 to 40% by weight based on the total weight of the matrix and the particulate substrate. Most preferably, the particulate substrate forms about 35% by weight based on the total weight of the matrix and the particulate substrate.

Embedding the particulate substrate in the matrix material may be accomplished by a number of means. The matrix material may be melted, the particulate substrate added, and the matrix material solidified so as to form a dispersion of the substrate in the matrix. An intimate mixture of powdered matrix material and particulate substrate may be formed, and the mixture melted or sintered to form a homogeneous dispersion. In some embodiments, the particulate substrate is suspended in a glassy melt of the matrix.

In embodiments wherein the solid matrix material comprises or is $B_2O_3$ (including $^{10}B_2O_3$), the substrate is preferably mixed with powdered $B_2O_3$ and the whole is heated in a suitable receptacle beyond the melting point of $B_2O_3$ (i.e. 450° C.), such as over 500° C., preferably over 600° C., preferably over 700° C., such as about 750° C.

Alternatively, in some embodiments, the particulate substrate is mixed with a precursor of the matrix material. In one embodiment, the substrate is mixed with boronic acid ($H_3BO_3$), and the mixture heated so as to effect dehydration of boronic acid. Such dehydration may be effected by heating the mixture, such as over 500° C., preferably over 600° C., preferably over 700° C. In some embodiments, $H_3{}^{10}BO_3$ is employed.

To reach the highest efficacy of the irradiation procedure, it is preferable to keep the nanoparticles in a close contact with the $^{10}$B-rich environment. Preferably, this condition is met by creating a dispersion of the nanoparticles in molten boron oxide (including $^{10}B_2O_3$), which may be formed by thermal dehydration of boric acid (including $H_3{}^{10}BO_3$). As a primary source of $^{10}$B, isotopically enriched boric acid (99.5 mole % $^{10}$B) can be used, because boric acid with natural isotopic abundance contains only 20 mole % $^{10}$B and 80 mole % inert nuclide $^{11}$B. Notably, $H_3{}^{10}BO^3$ is generally available and inexpensive because large amounts are produced for the nuclear industry.

Having embedded the particulate substrate in the solid matrix, the matrix material may preferably be pulverised. This may be achieved using any technique suitable, such as a mortar and pestle or an electric mill.

The matrix with the embedded particulate substrate is exposed to a neutron flux. Any suitable neutron source may be used, including a nuclear reactor, a spallation source, or a radioisotope source. A nuclear reactor is preferred.

Neutrons of any energy range (temperature) may be employed. Preferably, neutrons having an energy of 0.0-0.025 eV (cold neutrons), about 0.025 eV (thermal neutrons), 0.025-0.4 eV (epithermal neutrons), 0.4-0.6 eV (cadmium neutrons), 0.6-1 eV (EpiCadmium neutrons), 1-10 eV (slow neutrons), 10-300 eV (resonance neutrons), 300 eV-1 MeV (intermediate neutrons), 1-20 MeV (fast neutrons), and >20 MeV (ultrafast neutrons) may be used. Preferably, neutrons having an energy of 0.01-0.4 eV, more preferably 0.02-0.03 eV, are used.

Alternatively, in one embodiment, neutrons without spectral (i.e. energetic) filtration are used to irradiate the matrix containing the particulate substrate. In this embodiment, the matrix containing the particulate substrate is preferably irradiated directly in a nuclear reactor. This offers operational simplicity over the use of neutrons having a defined energy.

The neutron flux is preferably between $1\times10^{10}$ cm$^{-2}$s$^{-1}$ and $1\times10^{15}$ cm$^{-2}$s$^{-1}$, more preferably $1\times10^{12}$ cm$^{-2}$ s$^{-1}$ and $1\times10^{14}$ cm$^{-2}$s$^{-1}$. For thermal and epithermal neutrons, flux of between $1\times10^{12}$ cm$^{-2}$ s$^{-1}$ and $1\times10^{14}$ cm$^{-2}$ s$^{-1}$ is preferred.

After irradiation, the matrix containing the particulate substrate may be allowed to rest. This allows any radioisotopes formed during irradiation to decay.

In one preferred embodiment, the matrix is removed to allow the irradiated particulate substrate to be recovered. This may be accomplished by physical or chemical means. The matrix material may be re-melted, and the irradiated particulate substrate recovered by e.g. filtration.

However, it is preferred that the matrix material is removed by chemical means. Suitably, this involves treatment with a solvent or reagent(s) that dissolve the matrix, but not the irradiated particulate substrate. Preferably, the matrix material is removed by treatment with aqueous acid or base. In the case where the matrix material comprises or consists of $B_2O_3$ (including $^{10}B_2O_3$), the matrix material is preferably dissolved in aqueous alkali, preferably aqueous sodium hydroxide.

After liberation from the matrix, the recovered irradiated particulate substrate may be subjected to one or more further washing steps to remove contaminants (such as radionuclides). Washing with aqua regia has been found useful in this context.

The recovered irradiated particulate substrate may be subjected to one or more further treatment steps, depending on the nature of the substrate and the intended use. Preferably (for example in the case of nanoparticulate diamonds, NDs), the recovered irradiated particulate substrate is subjected to a step of annealing in an inert (preferably argon or nitrogen) atmosphere or in vacuo at a temperature of above 600° C., preferably above 750° C., more preferably above 850° C., such as about 900° C. This process facilitates recombination of lattice vacancies created during irradiation with lattice impurities such as substitutional nitrogen atoms to form impurity-vacancy pairs. For example, nitrogen atoms form upon annealing with vacancies nitrogen-vacancy centers.

After the above-mentioned annealing step, the annealed particulate substrate is preferably subjected to a further heat treatment step in air. This is preferably conducted at a temperature of above 400° C., preferably above 450° C., more preferably between 500° C. and 550° C., such as about 510° C. This step causes oxidation of the diamond and removal of $sp^2$ carbon structures which may be present at the surface.

In particular aspects of the invention, the process of the invention may be applied to production of two fluorescent nanomaterials of research interest: nanodiamonds with nitrogen-vacancy centers and silicon carbide nanoparticles (SiC) with carbon antisite-vacancy pairs. High-quality fluorescent nanoparticles are obtained, using irradiation times as short as 3 minutes for nanodiamonds and 15 minutes for SiC.

Herein is described an approach for mass production of ion-irradiated nanoparticles using light ions (preferably α particles and $^7Li^+$ ions) generated in situ. The target nanoparticles are dispersed in $^{10}B$ containing (preferably isotopically-enriched) solid matrix and placed in an isotropic neutron flux, where a neutron-induced reaction on $^{10}B$ occurs homogeneously. The approach utilizes the advantages of neutrons, including their long penetration depth into the target determined mainly by their absorption cross-sections, the absence of threshold energy for a nuclear reaction, and the availability of scale-up of irradiated material to tens of grams. The all-directional local flux of light ions formed in situ from $^{10}B$ uniformly irradiates the surrounding nanoparticles. Moreover, using high neutron fluence rates ($10^{12}$-$10^{14}$ $cm^{-2}s^{-1}$), which are routinely available in experimental nuclear reactors, unusually high fluxes of energetic ions can also be achieved. Therefore, the inventive methods achieve effects comparable to hours of irradiation in accelerator devices in a few minutes and with much larger volumes.

The inventive methods are used to demonstrate benefits in the production of two fluorescent nanomaterials: diamond nanocrystals bearing fluorescent nitrogen-vacancy (NV) color centers in the crystal lattice (FNDs) and cubic silicon carbide nanoparticles bearing carbon antisite-vacancy pairs. Both nanomaterials are currently of great research interest because they provide unprecedented optical, electronic, and magnetic properties.

Furthermore, the inventive methods are amenable to scale-up of the irradiation procedure. For example, 70 g of fluorescent nanodiamonds in an approximately 30-minute irradiation session have been obtained. The inventive method thus increased current preparative yields by a factor of $10^2$-$10^3$, allowing production of hundreds of grams of nanoparticles in one day.

EXAMPLES OF CARRYING OUT THE INVENTION

Experimental Methods

Chemicals

Sodium hydroxide, hydrochloric acid (35%), nitric acid (65%), and sulfuric acid (96%) were purchased from Penta (Czech Republic). Potassium nitrate and hydrofluoric acid (40%) were purchased from Sigma Aldrich (Prague, Czech Republic). All chemicals were p.a. quality and were used as received without further purification. Boric acid enriched to 99.5% $^{10}B$ was supplied by Katchem Ltd., Czech Republic. Boron (III) oxide (99.9+%) was purchased from Strem Chemicals, Inc. Deionized water used for all washing steps and preparation of solutions was prepared with a Millipore Synergy UV Ultrapure water system.

ND and SiC Pretreatment

NDs were supplied by Microdiamant Switzerland (MSY 0-0.05 and MSY 0-0.25, containing approximately 100-200 ppm of natural nitrogen impurities). The NDs were oxidized by air in a furnace (Thermolyne 21100 tube) at 510° C. for 5 h and subsequently carefully purified to remove trace amounts of elements (e.g., iron) that may activate in neutron flux, producing undesirable radioactive contamination of the product. The product had negligible radioactivity after the following purification was implemented. The NDs were treated with a mixture of $H_2SO_4$ and $HNO_3$ (9:1) at 90° C. for 3 days and washed with water, 1 M NaOH, and 1 M HCl. They were washed an additional 5 times with water and then freeze-dried. Purified ND powder (500 mg) was mixed with 2.0 g $H_3{}^{10}BO_3$ ground in a mortar and transferred into a synthetic corundum crucible. The mixture was placed in a vertical furnace (Thermolyne 21100 tube) and heated to 600° C. for 5 min (until the development of water vapor ceased). The temperature was then increased to 700° C., and the melt was homogenized by mixing and left to cool to RT. The final glassy composite was first ground in a mortar and then pulverized in a small ball mill. The typical weight loss within such melting was 39% due to dehydration of boric acid to boron (III) oxide. The final melt used for irradiations contained 33 weight % NDs and 22 weight % $^{10}B$.

Cubic SiC nanoparticles (PlasmaChem GmbH, PL-CT-SiC, 150-200 nm; 1.00 g) were mixed with boron oxide (2.25 g) and ground in an agate mortar. The mixture was transferred into a porcelain crucible and heated in a vertical furnace (Nabertherm RT 50-250/13) at 720° C. for 10 min. The viscous melt was homogenized by mixing, scraped out with a spatula and left to cool down to RT. The final light-gray glassy composite was ground in a ball mill and finely pulverized in a mortar.

Irradiation and Treatment of ND and SiC

The powderized melts of ND and $^{10}B_2O_3$ were sealed in quartz glass, sodium-free capillaries (inner diameter, 1.5 mm; height of the melt, 11 mm), inserted in an aluminum container, and irradiated in a vertical water-cooled (~45° C.)

channel H8 positioned in the Be reflector of the LVR-15 nuclear reactor of Research Centre Rez, Ltd. at neutron fluence rates of $2\times10^{13}$ cm$^{-2}$s$^{-1}$, $1\times10^{13}$ cm$^{-2}$s$^{-1}$, and $7\times10^{12}$ cm$^{-2}$s$^{-1}$ for thermal, epithermal, and fast neutrons, respectively, for various periods of time (3-100 min). Neither NDs nor quartz glass should contain traces of sodium because the natural monoisotope $^{23}$Na is readily neutron-activated into $^{24}$Na, which is a beta and gamma emitter with a half-life of 14.997 h. If there are traces of sodium in the starting materials, an easy option is to allow $^{24}$Na to decay for 10 half-lives (one week, or a shorter time if less contaminated) after irradiation.

The sample can be handled then as non-radioactive. After irradiation, the capillaries were opened and left overnight in a vial with 6 M NaOH at 60° C. to dissolve boron (III) oxide. The residue adhering to quartz glass was released in an ultrasonic bath. Supernatant was washed gradually with 6 M NaOH, H$_2$O, 1 M HCl, and 5 times with H$_2$O. Possible quartz glass splinters were separated by sedimentation. The supernatant was treated with concentrated HF for 12 h; washed with H$_2$O, 1 M HCl, and 5 times with H$_2$O; and lyophilized.

Six quartz glass capillaries, each filled with 55 mg of SiC—B$_2$O$_3$ composite, were sealed into aluminum containers. The capillaries were irradiated for various periods of time (3-15 min) in vertical water-cooled (~45° C.) channel H8 of the LVR-15 nuclear reactor at neutron fluence rates of $3.6\times10^{13}$, $8.4\times10^{12}$ and $5.6\times10^{12}$ cm$^{-2}$s$^{-1}$ for thermal, epithermal and fast neutrons, respectively. After irradiation, the capillaries were opened and twice washed with 2 M NaOH at 95° C. to dissolve boron oxide. The supernatant was gradually washed with H$_2$O (twice), 1 M HCl, and H$_2$O (five times) and lyophilized. The obtained SiC powder was oxidized by air in a furnace (Nabertherm RT 50-250/13) for 3 h at 550° C.

Large-Scale Irradiation of NDs

For large-scale preparation, NDs were supplied by Henan Huifeng Diamond Co., Ltd., China (HFD-F, 35 nm). A thin layer of NDs (166.8 g) in a ceramic dish was oxidized by air in a furnace (Clasic CZ, 1013 S) at 510° C. for 3 h, providing 119.8 g of oxidized NDs (72% yield). The oxidized NDs (105.0 g) were mixed with boron oxide (236.3 g), ground in a mortar and heated in 20 g doses in a vertical furnace (Nabertherm RT 50-250/13) at 700° C., 10 min per dose. The viscous melt was homogenized by mixing, scraped out with a spatula and left to cool down to RT with a 94% total yield (321.8 g). The final glassy composite was ground in a ball mill (Retsch MM 400) and finely pulverized in a mortar.

The 10 purpose-made aluminum containers were filled with a composite powder (24 g per container), sealed and irradiated for 3 min in vertical water-cooled (~45° C.) channel H6 of the LVR-15 nuclear reactor at neutron fluence rates of $5.4\times10^{13}$, $7.7\times10^{13}$ and $6.5\times10^{12}$ cm$^{-2}$s$^{-1}$ for thermal, epithermal and fast neutrons, respectively. After the irradiation, the containers were left for 2 weeks in a shielded hot cell to allow decay of residues of short-lived radionuclides created by neutron activation. The containers were opened and the obtained powder was mixed with 1000 ml of 10% NaOH, stirred at 95° C. for 1 h to dissolve boron oxide and possible aluminum residues and left to sediment overnight. The sediment was washed once with H$_2$O, separated by centrifugation and treated with 800 ml of boiling aqua regia for 1 h to dissolve possible traces of long-lived radionuclides. The sediment was washed four times with H$_2$O and lyophilized. The final yield was 70 g of NDs in the form of a light grey powder (95% yield after workup).

Annealing and Oxidation

All ND samples were annealed at 900° C. for 1 h in an argon atmosphere followed by air oxidation at 510° C. for 4 h at normal pressure in a Thermolyne 21100 tube furnace calibrated with an external thermocouple (Testo AG 1009). According to the transmission electron microscopy (TEM) image analysis, the obtained particles were 35 nm in diameter.

TEM Measurement

For FND particle size distribution evaluation, the image analysis of TEM micrographs was used. For each sample, approximately 1000 particles were analyzed, their equivalent circular diameters acquired, and recalculated to volume-weighted histograms (FIG. 1). Carbon-coated copper grids (Pyser) were oxidized in a UV-ozonizing chamber (UV/Ozone Pro Cleaner Plus, Bioforce Nanosciences) for 15 min, then incubated in poly(ethyleneimine) solution (MW=2.5 kDa, 0.1 mg/ml) for 10 min, washed with water, and incubated in an aqueous solution of NDs (0.1 mg/ml) for 3 mins. Micrographs were taken with a JEOL JEM 1011 microscope at 80 kV acceleration voltage.

Analysis of particle size distributions was performed with ImageJ software. Particle size was expressed as equivalent circular diameter ($d_{eq}$), defined as the diameter of a circular particle with the same area as the particle of interest (S).

$$d_{eq} = \sqrt{4S/\pi}$$

Equivalent diameters were used to calculate particle volume (PV).

$$PV = \frac{4}{3}\pi\left(\frac{d_{eq}}{2}\right)^3$$

and subsequently for creation of volume-weighted histogram.

Fluorescence Measurements

The samples were prepared by drop-casting of the aqueous dispersion of NDs on the polished silicon wafer. Luminescence spectra were measured using a Renishaw InVia Raman Microscope; the excitation wavelength was 514 nm with 15 mW laser power, 20× objective. The exposure time was 6 seconds, accumulation 10 times; 20 measurements were made on each sample. The luminescence spectra were taken at room temperature and normalized to the diamond Raman peak.

FLIM/AFM Measurements of ND

The FNDs were deposited on an oxygen-plasma-cleaned glass cover slip by dip coating for 5 min and rinsed using DI water (MilliQ). The concentration of the stock solution of nanoparticles was 0.001 mg/ml. For FLIM, fluorescence images were taken using a time-resolved fluorescence confocal microscope (MicroTime200—PicoQuant), with excitation wavelength 532 nm, 1.2 mW laser power, using a 60× water immersion objective (Olympus) and a 650 long pass filter (Edmund Optics, OD4). Data were processed using Matlab (R2014b, Mathworks). Selection of FNDs was performed using calculated fast fluorescence lifetime (FLIM) (>6 ns) and counts/pixel (>10 cts) thresholds. To obtain normalized PL intensity per particle, the measured fluorescence intensities were normalized to the calculated average fluorescence intensity of single NV center (based on correlation measurements). The normalized intensity therefore represents approximately the number of NV centers in the particle. AFM images were taken on a JPK Nanowizard® AFM combined on the FLIM Microtime setup. Scans were performed using AC mode measurements using silicon probes (ACTA, with aluminium coating of the reflex side, ACTA300—TL).

Spectral Characterization of SiC

Round microscope cover glasses with 25-mm diameter were used as substrates. The coverslips were immersed overnight in a concentrated KOH/methanol solution and then thoroughly washed with deionized water and dried. The samples were prepared by drop-casting 15 µL 0.01 mg/ml aqueous solution of SiC particles. To localize the particles, a time-resolved confocal fluorescence microscope system [MicroTime 200 (PicoQuant, GmbH) with 60×, 1.2 N.A. equipped with a 531 nm pulsed diode laser and water-immersion objective] was used to record fluorescence images. Fluorescence spectra of single particles were recorded in fixed-point measurement mode using a fiber-coupled Shamrock 303i spectrograph with an iXon Ultra EMCCD camera (Andor). Spectra were recorded at 30 µW excitation power and 15 s integration time. Final spectra were prepared by subtracting a dark spectrum recorded from an empty substrate under the same conditions.

Example 1

To reach the highest efficacy of the irradiation procedure, it is preferable to keep the nanoparticles in a close contact with the $^{10}$B-rich environment. Preferably, this condition is met by creating a dispersion of the nanoparticles in molten boron oxide (including $^{10}B_2O_3$), which may be formed by thermal dehydration of boric acid (including $H_3^{10}BO_3$). As a primary source of $^{10}$B, isotopically enriched boric acid (99.5 mole % $^{10}$B) may be used. However, boric acid with natural isotopic abundance 20 mole % $^{10}$B and 80 mole % inert nuclide $^{11}$B, can be used as well. Notably, $H_3^{10}BO_3$ is generally available and inexpensive because large amounts are produced for the nuclear industry.

Two glass melts containing a 33% by weight dispersion of 35-nm and 150-nm NDs in $^{10}B_2O_3$ were prepared as described in Experimental Procedures. To generate all-directional local flux of α particles and $^7Li^+$ ions creating vacancies in ND crystals, both glass melts were loaded in quartz tubes and irradiated in a nuclear reactor for 3 min. After irradiation, the $^{10}B_2O_3$ matrix was dissolved in NaOH solution and the NDs were further processed by annealing to form fluorescent NV centers and surface oxidation by air followed by treatment with a mixture of mineral acids.

Figure 2:
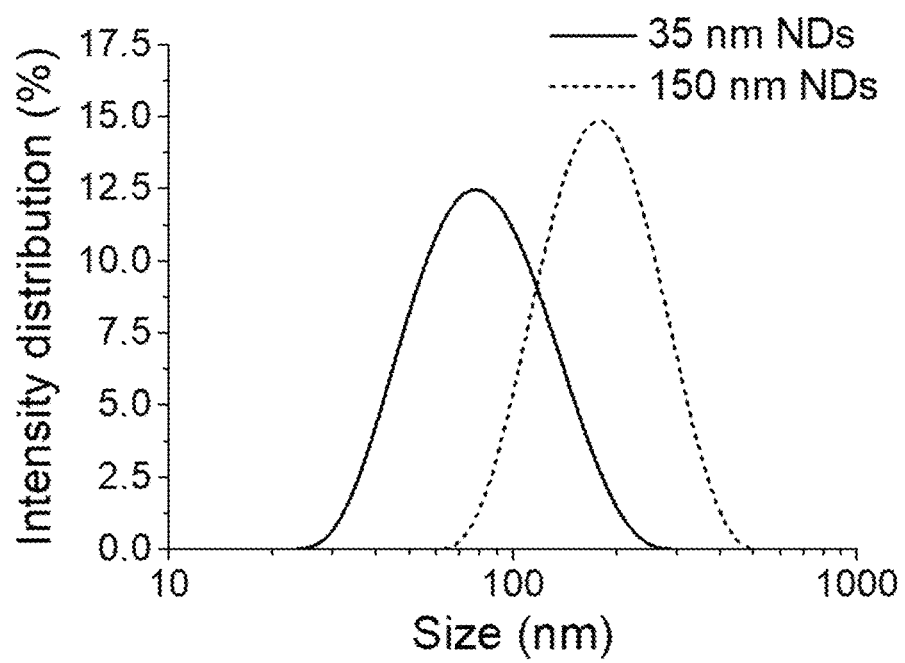
FIG. 2 is a graph showing dynamic light scattering (DLS) size distribution of 35-nm and 150-nm FNDs in aqueous solution. Concentration of the colloids was 0.5 mg/ml.

Isolation from the $^{10}B_2O_3$ melt was almost quantitative in yield and provided NDs with the characteristic size distribution (FIG. 1) and colloidal stability in aqueous solutions (FIG. 2). Zeta potentials were −46.7 mV for 35-nm NDs and −41.0 mV for 150-nm NDs, suggesting strong Coulombic stabilization by negative charge of deprotonated carboxylates created by oxidation on the surface of the nanoparticles.

Figure 3:
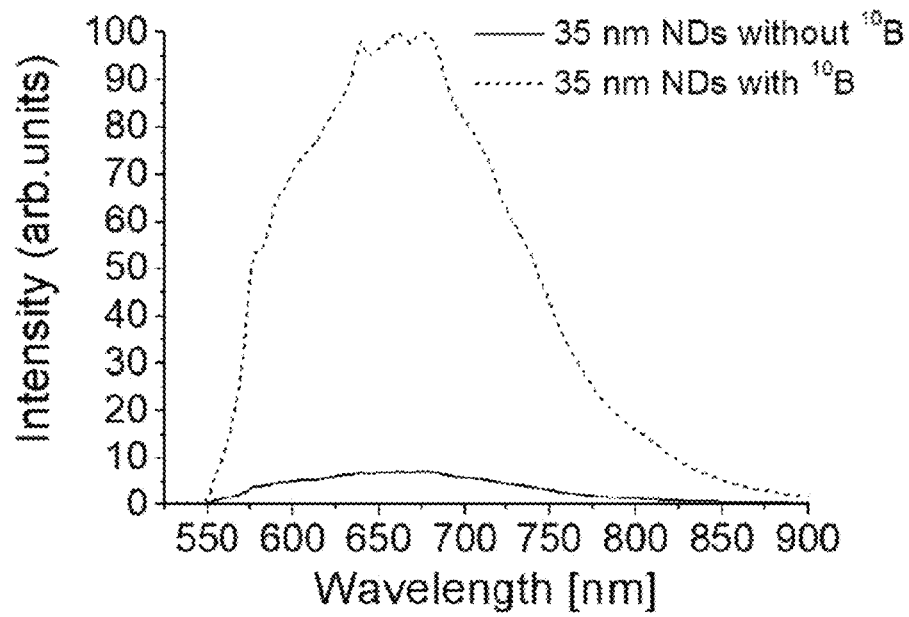
FIG. 3 is a photoluminescence spectrum of 35-nm NDs irradiated by neutrons only (control sample without presence of $^{10}$B$_2$O$_3$) and by neutrons in a melt of $^{10}$B$_2$O$_3$ according to method of the invention

FIG. 3 shows a comparison of fluorescence intensity of 35-nm NDs irradiated by neutrons only (control sample without presence of $^{10}B_2O_3$) and by neutrons in a melt of $^{10}B_2O_3$. The fluorescence intensity of the sample irradiated with $^{10}B_2O_3$ is 14× higher than that of the sample irradiated without $^{10}B_2O_3$.

Figure 4:
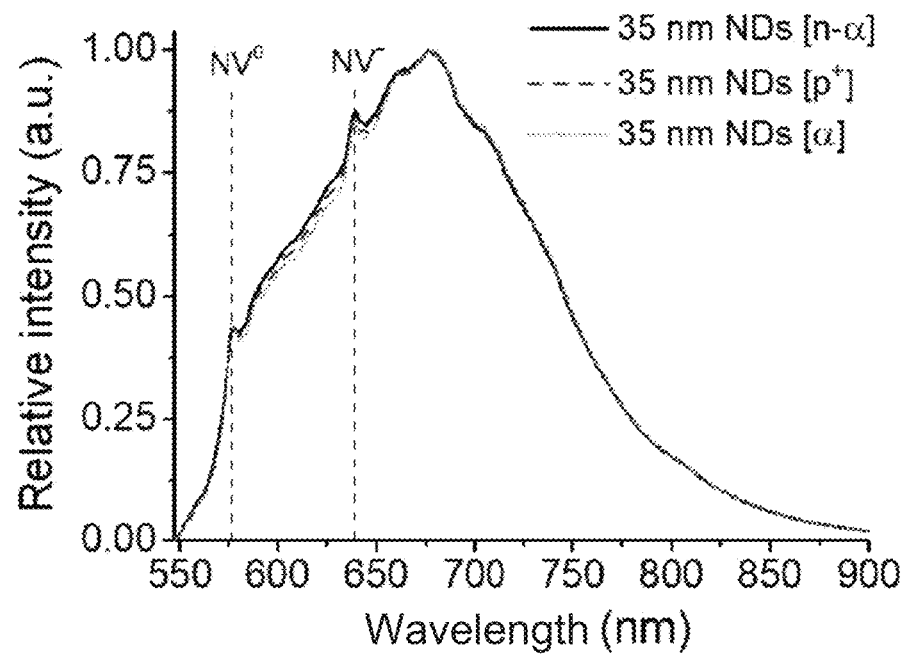
FIG. 4 shows comparison of photoluminescence spectra of 35-nm ND samples irradiated in a nuclear reactor (n-α) according to method of the invention with samples irradiated in a cyclotron with protons (p$^+$) or α particles.
Figure 5:
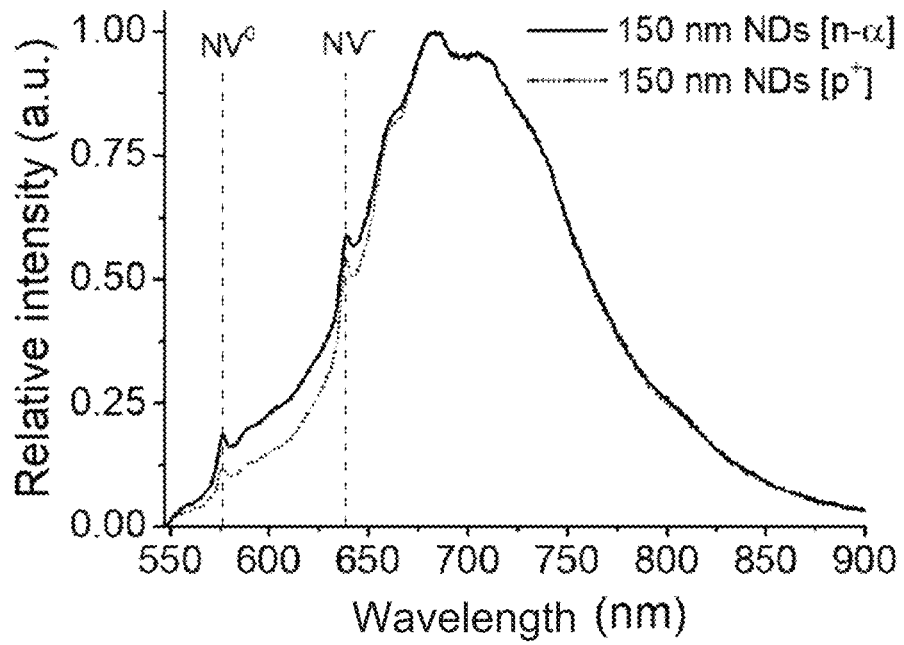
FIG. 5 shows comparison of photoluminescence spectra of 150-nm ND samples irradiated in a nuclear reactor (n-α) according to method of the invention with samples irradiated in a cyclotron with protons (p$^+$).

FIG. 4 shows comparison of photoluminescence spectra of 35-nm and 150-nm ND samples irradiated in a nuclear reactor (n-α) with samples irradiated in a cyclotron with protons ($p^+$) or α particles. FIG. 5 shows comparison of photoluminescence spectra of 150-nm ND samples irradiated in a nuclear reactor (n-α) with samples irradiated in a cyclotron with protons ($p^+$). The spectra in both FIGS. 4 and 5 are normalized at their maxima. Vertical dash lines labeled ZPL denotes the zero phonon line of the NV$^-$ (wavelength 637 nm) and NV$^0$ (wavelength 575 nm) color center with typical phonon side band structures.

The NV$^-$/NV$^0$ zero phonon line (ZPL) intensity ratios and the width of the ZPL and phonon replicas were similar for neutron-irradiated NDs in $^{10}B_2O_3$ glass and for FNDs prepared using direct cyclotron irradiation with either $p^+$ or α particles (FIGS. 4 and 5). Because these spectral parameters are related to the crystal properties (formed irregularities, other defect centers) and surface properties, the similarities in the observed spectra indicate that the samples prepared by the different types of irradiation have comparable damage to the crystal lattice.

Another important quality of the FNDs is the fraction of fluorescent particles in the material. To distinguish the fluorescent and non-fluorescent NDs present in a large ensemble at the single-particle level, simultaneous measurement of fluorescence-lifetime imaging microscopy (FLIM) and atomic force microscopy (AFM) was utilized. The fraction of FNDs in material irradiated in a nuclear reactor increased by a factor of 2.6 compared to optimally (Havlik, J. et al. Boosting nanodiamond fluorescence: towards development of brighter probes. *Nanoscale* 5, 3208-3211 (2013)) $p^+$-irradiated pellet target with NDs in an accelerator (49% vs. 19%). The procedure of the invention thus increases the homogeneity of irradiation. Moreover, the particles irradiated in a nuclear reactor were brighter on average and contained a significantly higher fraction of very bright particles (fluorescence intensity corresponding to approximately 5 NV centers and higher). Furthermore, the accelerator irradiation which was compared took 4.5 h (in contrast to 3 min in a reactor).

TABLE 1

Isotropic irradiation with energetic light ions leads to a higher fraction of fluorescent particles and to higher fluorescence intensities. The table compares fluorescent NDs prepared by neutron irradiation in a reactor (this Example 1) and proton irradiation in a cyclotron using an optimized pellet target with large-scale production of NDs in the reactor (irradiation of 240 g ND-B$_2$O$_3$ composite in Example 2). The fluorescence intensity is normalized to the average intensity of one NV center in a ND particle. Parameters were calculated from more than 400 particles.

|  | Irradiated in reactor | Proton irradiated | Irradiated in reactor (large scale) |
|---|---|---|---|
| Fraction of fluorescent particles | 49% | 19% | 41% |
| Average fluorescence intensity per particle (normalized/a. u.) | 3.2 | 1.7 | 2.7 |
| Median fluorescence intensity per particle (normalized/a. u.) | 2.1 | 1.4 | 1.8 |

Example 2

The method of the invention was applied to the preparation of a large amount of FNDs. First, the preparation, irradiation and processing procedures were adapted for large-scale conditions. In this case, B$_2$O$_3$ with natural isotope abundance was used. For irradiation, double-walled containers were designed enabling sufficient heat dissipation to cooling media in the nuclear reactor and isotropic irradiation of the composite by neutrons. Upon irradiation of 10 containers containing a total of 240 g ND-B$_2$O$_3$ composite with 33% w/w content of ND (each container for 3 min, total irradiation time 0.5 h) and standard processing, 70 g FNDs were obtained (95% yield based on the initial amount of the composite). This amount is more than two orders of magnitude higher than any reported FND preparation.

Figure 6:
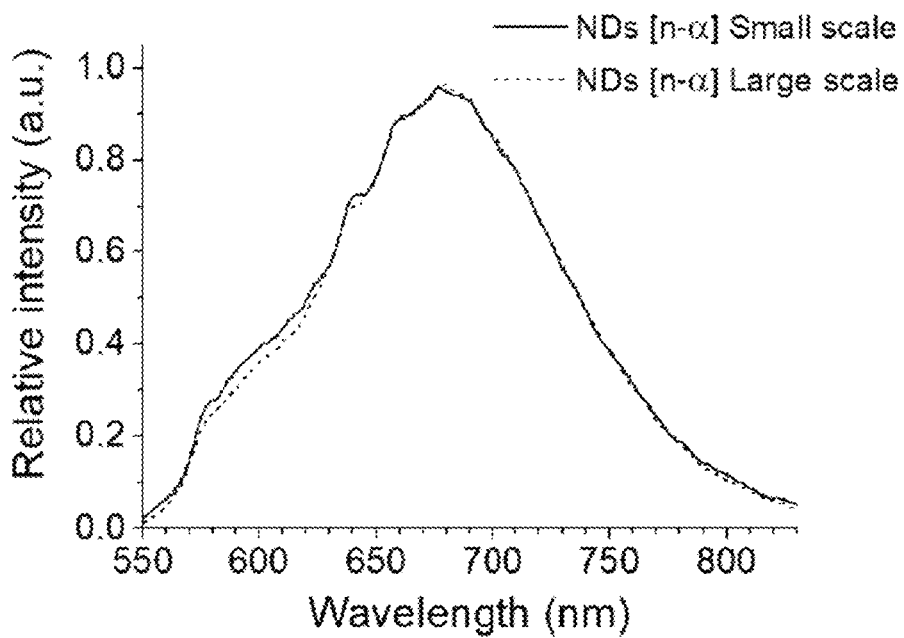
FIG. 6 shows photoluminescence spectra of 35-nm NDs irradiated in a nuclear reactor at a small and large scale according to method of the invention. The spectra were normalized to their maxima.

FIG. 6 shows photoluminescence spectra of 35-nm NDs irradiated in a nuclear reactor at a small and large scale normalized to their maxima. The FNDs showed equal spectral features compared to initial small batches irradiated in capillaries (FIG. 4). Photoluminescence spectra confirmed the presence of NV centers in FNDs with NV$^-$/NV$^0$ ZPL intensity ratios identical to those of the corresponding small batch. Importantly, the scale up procedure only slightly affected the homogeneity of irradiation and FND brightness (Table 1). The fraction of FNDs in the material was higher by a factor of 2.2 than optimally p$^+$-irradiated pellet target with NDs in an accelerator (41% vs. 19%). These results show that the large-scale preparation provides FNDs with comparable quality to the small scale.

Overall, the large-scale experiments demonstrated that short irradiation time and space capacity of irradiation channels in the nuclear reactor provides the possibility of semi-continuous production of hundreds of grams of FNDs per day. In comparison to irradiation with electrons or energetic ions in accelerators, in which the yield typically reaches hundreds of milligrams per day, the inventive process increased the output of FNDs by a factor of approximately $10^2$-$10^3$. This allows for unprecedentedly high preparative yields and economically feasible production of irradiated nanoparticles (the price per hour of irradiation is similar for nuclear reactors and accelerators).

Example 3

Figure 7:
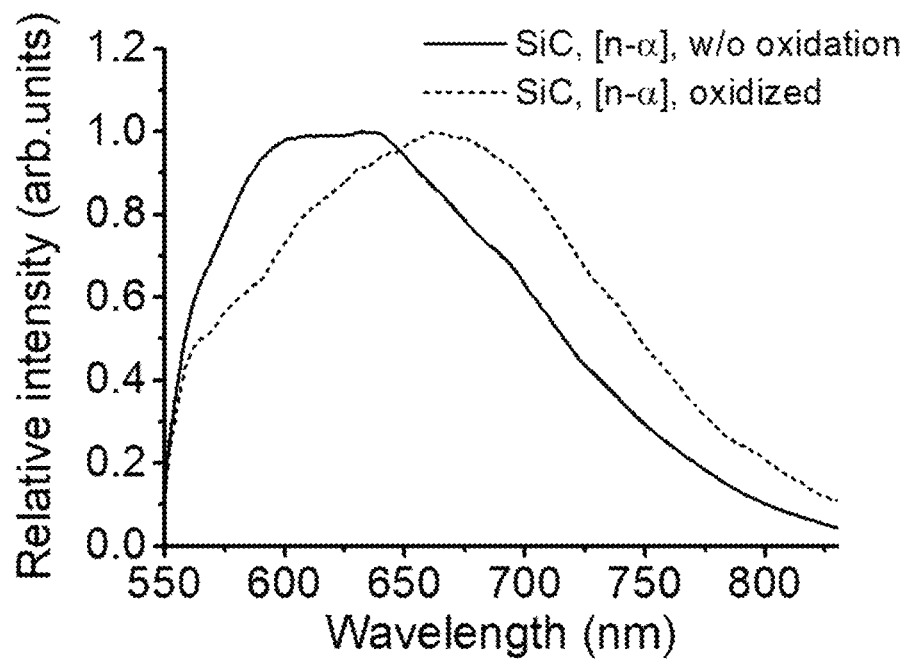
FIG. 7 shows photoluminescence spectrum of SiC nanoparticles irradiated according to method of the invention ("w/o oxidation") and SiC nanoparticles irradiated according to method of the invention, oxidized and annealed ("oxidized"). The SiC particles were deposited on a glass cover slip.

To demonstrate the capability of the method of the invention to produce lattice defects in a different material, silicon carbide (SiC) was also utilised. Similarly as for NDs, a composite of cubic 3C-SiC nanoparticles (30.7% by weight in the composite) with $B_2O_3$ was prepared, irradiated in a nuclear reactor, and processed (see Experimental Methods). After irradiation for 15 min and subsequent annealing and oxidation in air, strongly luminescent nanoparticles were obtained with one dominant peak around 670 nm in the photoluminescence spectrum (FIG. 7). This band was previously observed in electron-irradiated and oxidized 3C—SiC nanoparticles and was assigned to the carbon antisite-vacancy defect.

FIG. 7 shows photoluminescence spectrum of only irradiated ("w/o oxidation") and of irradiated, oxidized and annealed ("oxidized") SiC nanoparticles. The band around 670 nm was assigned to the carbon antisite-vacancy pair.

Oxidation further improved the solubility of both irradiated and non-irradiated samples and led to stabilization of luminescence. Overall, the data point towards effective creation of photoluminescent point defects in cubic SiC nanoparticles and demonstrate the capability of the irradiation method of the invention for nanomaterials other than NDs.

In conclusion, herein described is an easily scalable method for production of light ion-irradiated nanoparticles utilizing a particle and $^7$Li$^+$ ions generated in situ. The target nanoparticles embedded in $^{10}$B-isotopically enriched boric oxide are placed in a neutron flux, where neutron-induced nuclear reaction on $^{10}$B occurs homogeneously, producing an isotropic all-directional flux of light ions. These ions create structural defects in the nanoparticles. The inventive method thus combines the advantages of the neutron and ion irradiation approaches. Its usefulness for production of FNDs bearing nitrogen-vacancy color centers and of 3C—SiC nanoparticles with carbon antisite-vacancy pairs has been demonstrated. In a large-scale pilot experiment, 70 g FNDs were prepared during a half-hour irradiation session using boric oxide with natural isotopic abundance of $^{10}$B. The irradiation was highly homogeneous, producing material with a high fraction of bright fluorescent particles. Because of the favorably high cross section of $^{10}$B for neutron capture, the inventive method can operate with extremely rapid irradiation times of only a few minutes. This provides access to yields of hundreds of grams of nanoparticles per day, accelerating the current production rates by a factor of $10^2$-$10^3$.

The technique, combined with general accessibility to nuclear reactors (currently, 59 research nuclear reactors useful for this type of irradiation with public access are operating worldwide), can facilitate production of well-defined light ion-irradiated nanoparticles that can be widely used in diverse applications, such as in semiconductor, magnetic, quantum sensing, optical, and bioimaging devices.

The invention claimed is:

1. A process for ion irradiation of a particulate substrate selected from diamond particles or silicon carbide particles, comprising the steps of:
   a. embedding particulate substrate in a solid matrix comprising $^{10}$B atoms;
   b. exposing the matrix obtained in step a) to a neutron flux; and
   c. dissolving the solid matrix;
   to provide irradiated particulate substrate.

2. The process according to claim 1 wherein the solid matrix comprises at least one of $H_3^{10}BO_3$ and $^{10}B_2O_3$.

3. The process according to claim 1 wherein the matrix comprises boron having the natural isotopic ratio of $^{10}$B to $^{11}$B.

4. The process according to claim 1 wherein the matrix comprises boron that is enriched in $^{10}$B compared to the natural isotopic ratio of $^{10}$B to $^{11}$B.

5. The process according to claim 1 wherein the particulate substrate is a nanoparticulate substrate having particle diameter of between 0.5 nm and 10 μm.

6. The process according to claim 1 wherein the particulate substrate comprises particles having a median (D50) diameter of between 1 nm and 2 μm.

7. The process according to claim 1, wherein the amount of particulate substrate is from 1 to 50% by weight, based on the total weight of the solid matrix and the particulate substrate.

8. The process according to claim 1 wherein the particulate substrate is embedded in the matrix by mixing the particulate substrate with the solid matrix material, melting the matrix material, and solidifying the matrix to form a solid dispersion.

9. The process according to claim 1 wherein the neutron flux is between $1 \times 10^{10}$ cm$^{-2}$s$^{-1}$ and $1 \times 10^{15}$ cm$^{-2}$s$^{-1}$.

10. The process according to claim 1 comprising a further step of annealing the irradiated particulate substrate.

11. The process according to claim 1 wherein the particulate substrate comprises diamond nanoparticles.

12. The process according to claim 1 wherein the neutron flux is between $1 \times 10^{12}$ cm$^{-2}$s$^{-1}$ and $1 \times 10^{14}$ cm$^{-2}$s$^{-1}$.

13. The process according to claim 10, wherein the step of annealing the irradiated particulate substrate is performed in argon atmosphere, in vacuo, or in the presence of nitrogen.

14. The process according to claim 1, wherein the particulate substrate comprises silicon carbide.

15. The process according to claim 14, wherein the silicon carbide is the cubic 3C—SiC polytype of silicon carbide.

16. A process for creating nitrogen-vacancy centers in diamond particles, comprising the steps of
  a. embedding diamond particles in a solid matrix comprising $^{10}$B atoms;
  b. exposing the matrix obtained in step a) to a neutron flux; and
  c. dissolving the solid matrix;
  to provide diamond particles with antisite-vacancy pairs.

17. A process of creating carbon antisite-vacancy pairs in silicon carbide particles comprising the steps of
  a. embedding silicon carbide particles in a solid matrix comprising $^{10}$B atoms;
  b. exposing the matrix obtained in step a) to a neutron flux; and
  c. dissolving the solid matrix;
  to provide silicon carbide particles with carbon antisite-vacancy pairs.

\* \* \* \* \*